(12) United States Patent
Cai

(10) Patent No.: US 7,735,674 B2
(45) Date of Patent: Jun. 15, 2010

(54) SEALED FOOD BOX

(76) Inventor: Cangyang Cai, Fengweipu, Erlangxiangwei, East Street, Ouanzhou, Fujian (CN) 362000

( * ) Notice: Subject to any disclaimer, the term of this patent is extended or adjusted under 35 U.S.C. 154(b) by 977 days.

(21) Appl. No.: 10/512,353

(22) PCT Filed: Jan. 28, 2003

(86) PCT No.: PCT/CN03/00089

§ 371 (c)(1),
(2), (4) Date: Oct. 22, 2004

(87) PCT Pub. No.: WO03/080471

PCT Pub. Date: Oct. 2, 2003

(65) Prior Publication Data

US 2006/0124654 A1    Jun. 15, 2006

(30) Foreign Application Priority Data

Mar. 11, 2002  (CN) .......................... 02 2 13288 U
Nov. 25, 2002  (CN) .......................... 02 2 55632 U

(51) Int. Cl.
  *B65D 45/16*  (2006.01)
  *B65D 1/36*   (2006.01)
(52) U.S. Cl. ..................... 220/324; 220/556
(58) Field of Classification Search ............. 220/793,
  220/784, 788, 780, 213, 265, 787, 789, 802,
  220/801, 800, 799, 796, 795, 260, 556, 555,
  220/553; D9/761, 737, 416, 414; *A45C 11/20;*
  *B65D 43/06, 43/10, 21/02*
See application file for complete search history.

(56) References Cited

U.S. PATENT DOCUMENTS

| | | | | | |
|---|---|---|---|---|---|
| 2,947,463 | A | * | 8/1960  | Conklin       | 229/404    |
| 3,077,284 | A | * | 2/1963  | McLaughlin    | 220/780    |
| 3,297,193 | A | * | 1/1967  | Stevens, Jr.  | 220/782    |
| 3,301,464 | A | * | 1/1967  | Amberg        | 229/125.17 |
| 3,358,875 | A | * | 12/1967 | Ekstrom       | 220/789    |
| 3,441,165 | A | * | 4/1969  | Zampichelli   | 220/787    |
| 3,458,079 | A | * | 7/1969  | Gasbarra      | 220/787    |
| 3,487,972 | A | * | 1/1970  | Swett         | 220/526    |
| 3,616,962 | A | * | 11/1971 | Phipps        | 220/789    |
| 3,719,304 | A | * | 3/1973  | Douglas       | 220/260    |

(Continued)

FOREIGN PATENT DOCUMENTS

CN      87 2 13782      5/1988

(Continued)

*Primary Examiner*—Anthony Stashick
*Assistant Examiner*—Robert J Hicks
(74) *Attorney, Agent, or Firm*—Greer, Burns & Crain, Ltd.

(57) ABSTRACT

A sealed food box includes a cover and a body. On the lower end face of the cover, there are grooves, which envelope the edges of the mouth. The inner walls of the grooves are fastened together with the inner side of the mouth by locking fasteners. A convex block on its outer wall inwardly presses the outer side of the mouth, firmly holding the cover and the body together. The inside of the body is divided into several partitions. The outside of the edges of the cover are provided with an opening lug and "Unused" mark. This product provides enhanced compression strength and sealing performance, prevents the outflow of food liquid and the influences of food with each other, and also avoids repeated use.

12 Claims, 5 Drawing Sheets

U.S. PATENT DOCUMENTS

Figure 1:
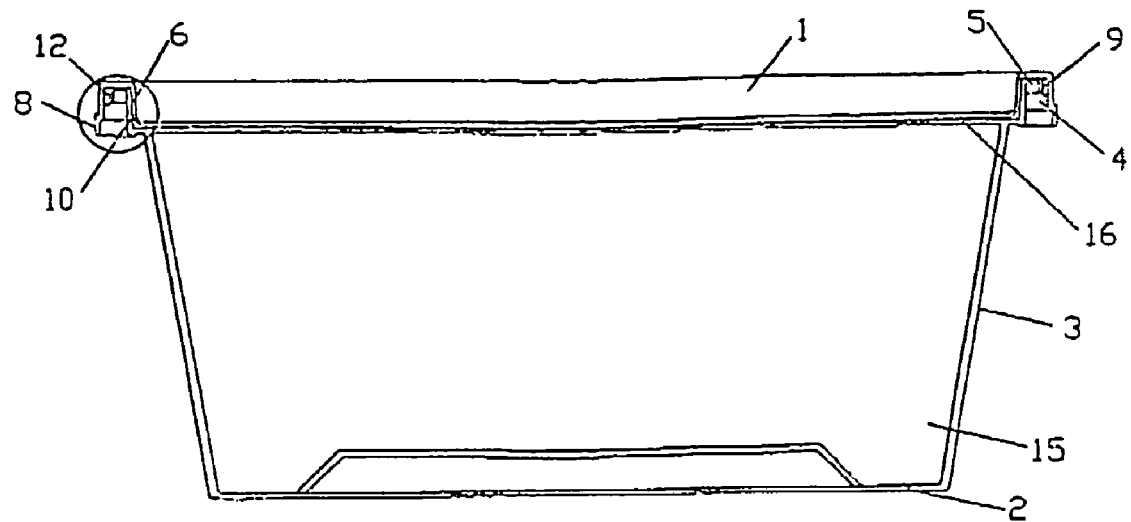

| | | | | |
|---|---|---|---|---|
| 3,749,277 A * | 7/1973 | Kinney | | 220/785 |
| 3,942,679 A * | 3/1976 | Starr | | 220/784 |
| 3,957,097 A * | 5/1976 | Swett | | 220/780 |
| 4,412,630 A * | 11/1983 | Daenen | | 220/792 |
| D274,030 S * | 5/1984 | Daenen et al. | | D7/391 |
| 4,670,352 A * | 6/1987 | Kurz | | 428/571 |
| 4,881,658 A * | 11/1989 | VanCucha | | 220/792 |
| 4,958,744 A * | 9/1990 | Bayly | | 220/305 |
| 5,219,087 A * | 6/1993 | Christensson | | 220/270 |
| 5,356,026 A * | 10/1994 | Andress et al. | | 206/508 |
| 5,518,133 A * | 5/1996 | Hayes et al. | | 220/793 |
| 5,617,968 A * | 4/1997 | Luburic | | 220/276 |
| D415,420 S | 10/1999 | Chen | | |
| 6,056,138 A | 5/2000 | Chen | | |
| 6,196,404 B1 | 3/2001 | Chen | | |
| 2003/0038134 A1 * | 2/2003 | Chasteen et al. | | 220/269 |
| 2003/0155365 A1 * | 8/2003 | Llorente Lecue | | 220/802 |

FOREIGN PATENT DOCUMENTS

| | | |
|---|---|---|
| CN | 87 2 11652 | 10/1988 |
| CN | 2150167 | 12/1993 |
| CN | 2470270 | 1/2002 |
| DE | 3518251 A1 * | 11/1985 |
| EP | 5264 A2 * | 11/1979 |
| EP | 215756 A2 * | 3/1987 |
| FR | 2558447 A1 * | 7/1985 |
| GB | 2086862 A * | 5/1982 |

* cited by examiner

SEALED FOOD BOX

TECHNICAL FIELD

This Invention is a kind of dinner box preventing food liquor from flowing out.

BACKGROUND TECHNIQUES

Current dinner boxes like lunch box, picnic box, snack box, etc. typically consist of cap and body. Food is placed in the box body, which features convenience of carrying and ease of use. To prevent outflow and leak of food liquor in the process of carrying, some dinner boxes are provided with sealing devices, e.g. Patent 86210848, 87216769, 89200752, 94222756, etc. Their sealing devices are made up of locking mechanism like clamp and screw, and sealing components, whose designs feature such disadvantages as complicated structure and high cost, and are not applicable to cheap plastic or paper snack boxes. Patent 89218416 is a kind of plastic snack box that employs two concave-convex benched self-locking devices instead of original plane anastomosis. It cannot be opened by itself but with outside force, and also improves sealing performances. However, it may deform under pressing and squeezing; thus a clearance may appear in the clamping part between the cover and the body, which cannot effectively prevent the outflow of food liquor.

Invention Publicity

This invention aims to provide a kind of sealed food box effectively preventing the outflow of food liquor.

It is also intended to provide a multi-partition food box preventing different-taste food from mixing with each other.

Another purpose is to provide a kind of throwaway food box with mark. After use, the mark will be damaged, which can effectively avoid repeated use.

The sealed food box for the first purpose consists of a cover and an open body made up of bottom and walls. Such box is provided with grooves on the lower end face of the cover. The said grooves envelope the edges of the box mouth of the body; the inner wall of the said grooves are fastened together with the inner side of the box mouth by using the locking fastener; and the convex block on its outer wall inwardly presses the outer side of the box mouth.

The above locking fastener includes the concave clamp on the inner wall of the groove and the convex clamp inside the box mouth.

The sealed food box for the second purpose comes with the following features. The box body consists of several separate partitions. Isolation grooves are set on the cover and the inner wall. Grooves envelope the edges of the inner walls, forming enclosed spaces with the above portions and the cover.

The sealed food box for the third purpose also includes an opening lug on the outer side of the edge of the cover, and the lug is provided with a mark saying "Unused" on its outer edge. The lug and the mark are connected with a dot-mode connection that can be easily broken.

The sealed food box designed in this invention comes with such features as simple structure, easy use and effective cost, and is suitable for mass production. In comparison with current products, it has the following distinctive characteristics. Firstly, the cover and the body are firmly fastened together by using the interactions between the inner and outer walls of the grooves on the cover and the inner and outer sides of the body, thus enjoying great compression strength and sealing performances, and effectively preventing the outflow of food liquor. Secondly, multi-partition structure is employed, which can prevent different-taste food from mixing with each other in the box. Thirdly, the opening lug is provided with the mark saying "Unused"; once the box opened, the mark will deform or break, facilitating effective identification, enabling consumers to identify used boxes, eliminating the possibility of repeated use and realizing the aim of health and environmental protection.

BRIEF DESCRIPTION OF ATTACHED FIGURES

The below is the further introduction to this invention in combination of the attached figures and some samples.

FIG. 1: Sectional View of Example 1

Figure 2:
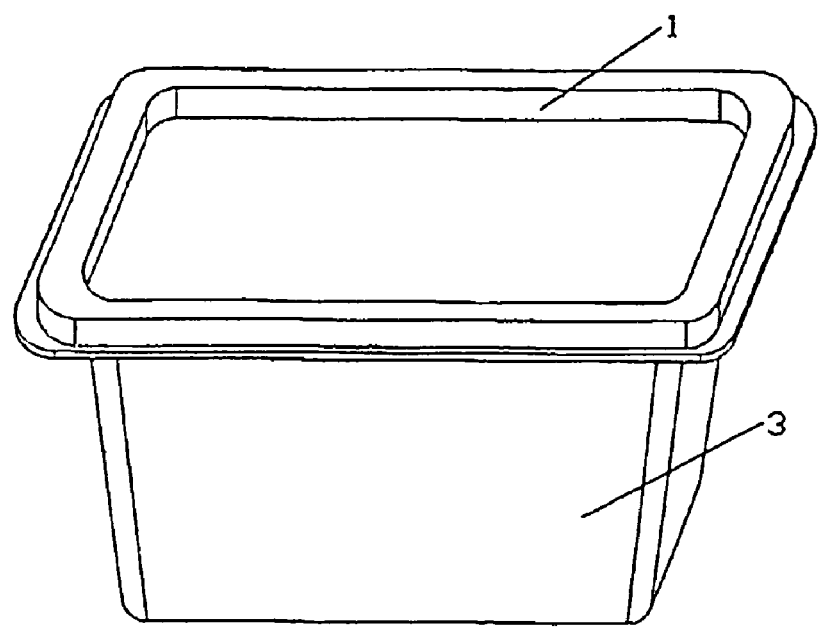

FIG. 2: Spatial Structural Schematic of Example 1

Figure 3:
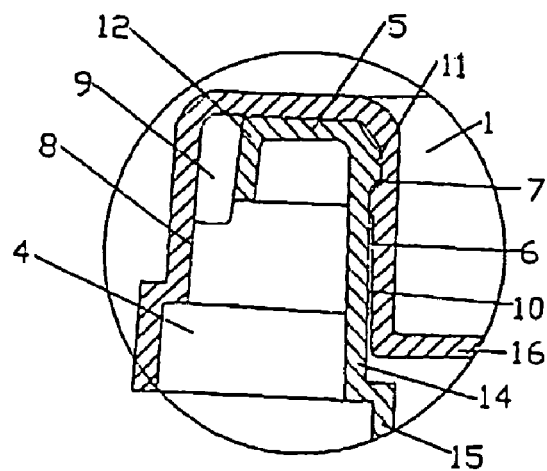

FIG. 3: Partial Enlarged View of Example 1

Figure 4:
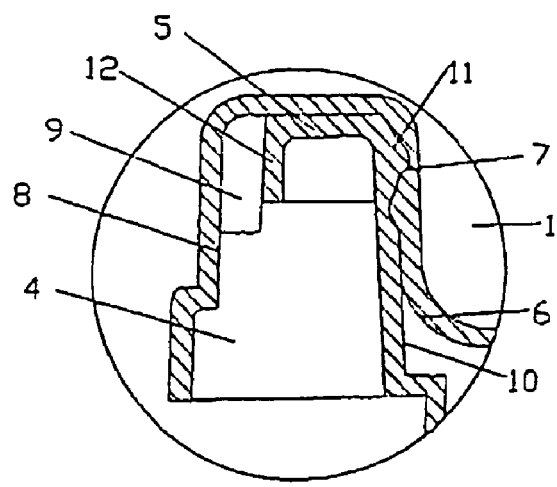

FIG. 4: Enlarged Structural View of Fastening Part Between Cover and Body of Example 2

Figure 5:
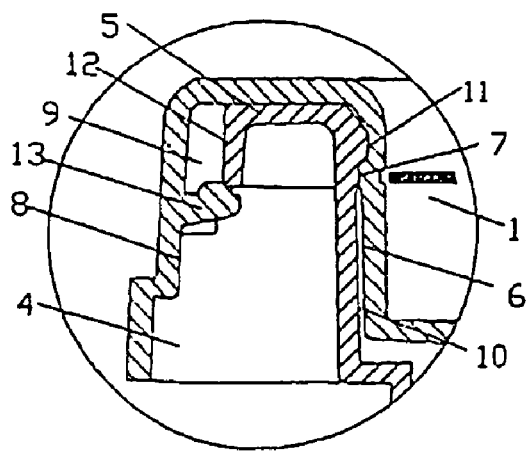

FIG. 5: Enlarged Structural View of Fastening Part Between Cover and Body of Example 3

Figure 6:
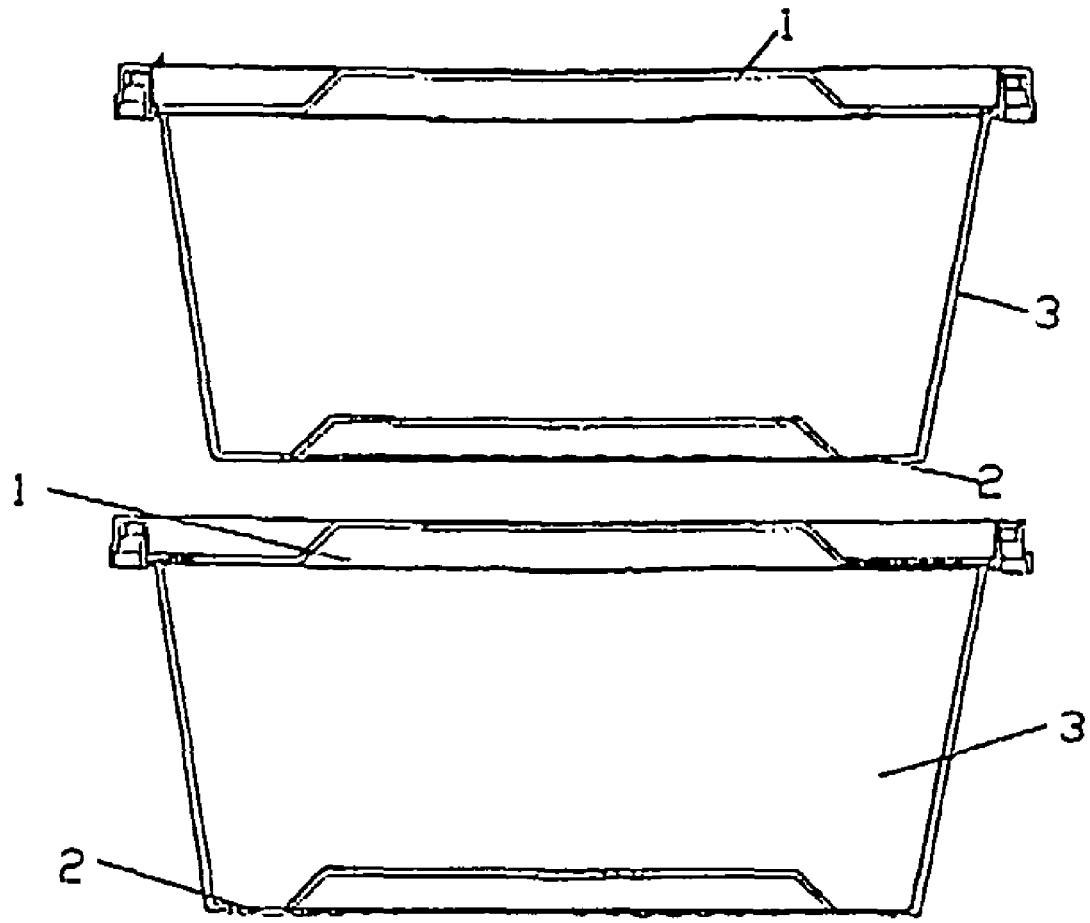

FIG. 6: Sectional Exploded View of Two-Box Overlapping

Figure 7:
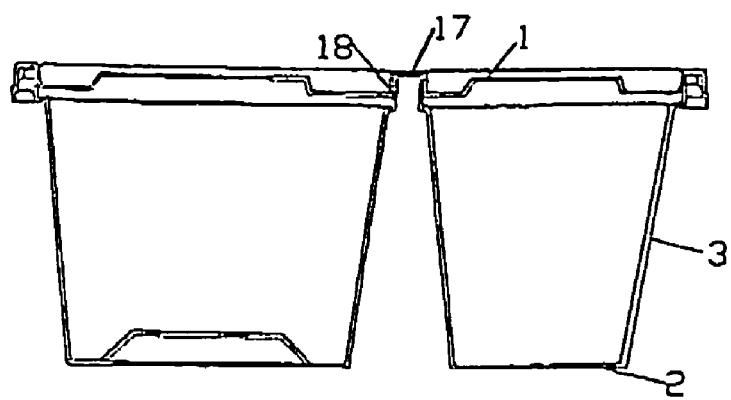

FIG. 7: Structural Schematic of Two-partition Sealed Food Box

Figure 8:
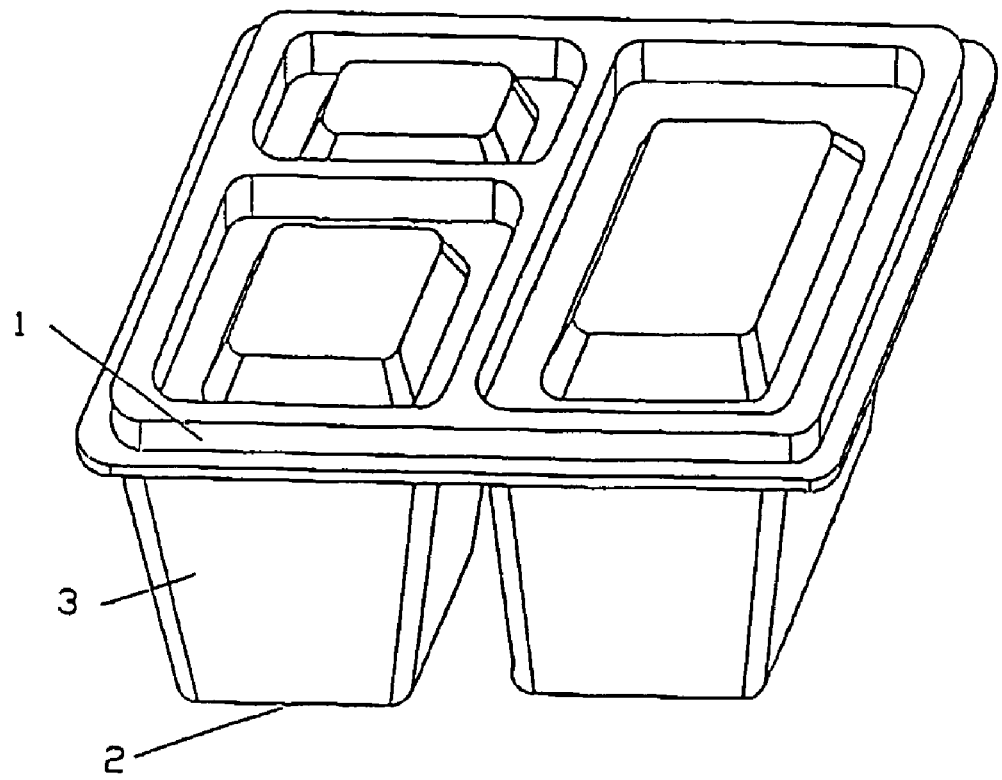

FIG. 8: Structural Schematic of Three-partition Sealed Food Box

Figure 9:
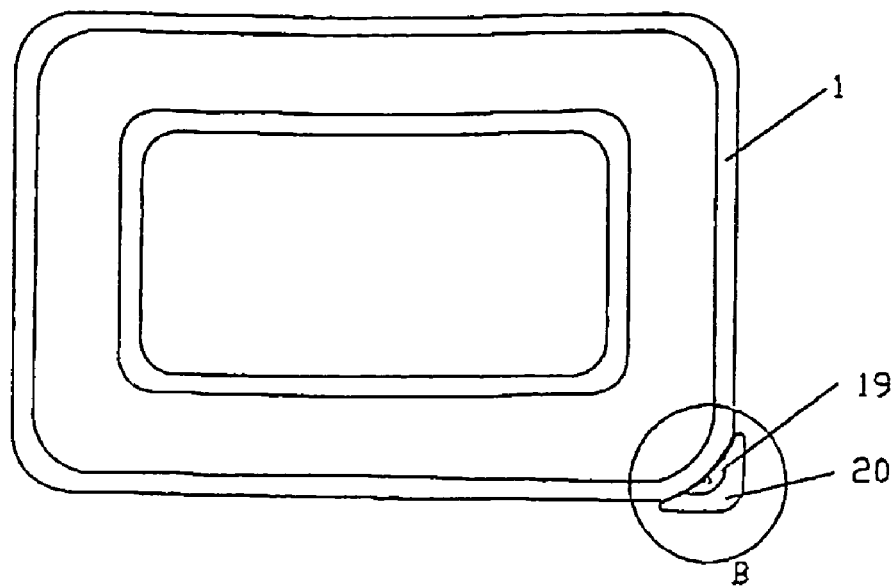

FIG. 9: Structural Schematic of Sealed Food Box with "Unused" Mark

Figure 10:
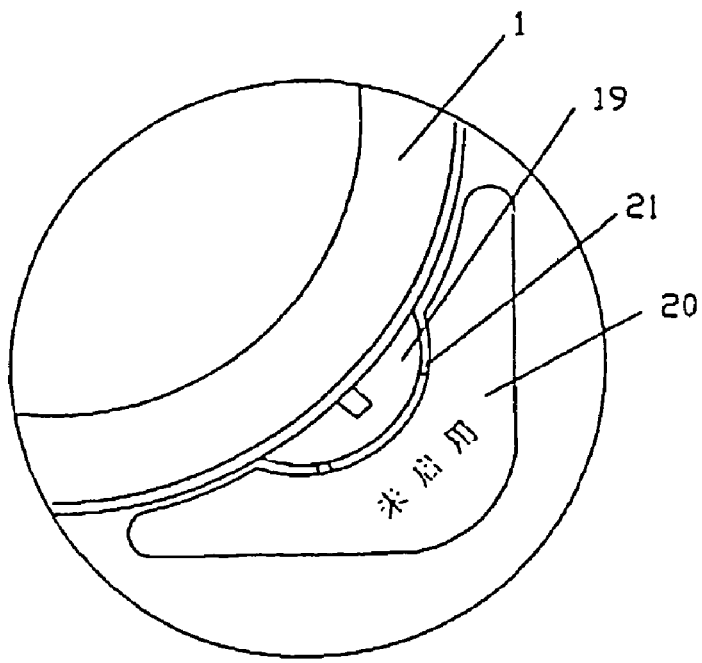

FIG. 10: Partial Enlarged View of FIG. 9

OPTIMUM METHOD TO REALIZE THIS INVENTION

The sealed food box designed in this invention can be made of recyclable plastic materials through extrusion and modeling. It can be recycled in accordance with the requirements for environmental protection. The food box adopts super-thin structure, and its thickness is smaller than 0.5 mm.

EXAMPLE 1

As shown in FIGS. 1 and 2, this sealed food box consists of the cover 1 and the open body made up of the bottom 2 and the wall 3. On the lower end face 16 of the cover 1, there is a downward groove 4. The inner wall 6 of the groove 4 is provided with the concave clamp 7, and the outer wall 8 of the groove 4 is provided with the convex block 9. This design uses the convex reinforcing rib on the outer wall 8 for the convex block 9, thus simplifying product structure and manufacturing techniques, and reducing cost. The upper part of the body is the mouth 14, and the lower part is the container 15. The upper part is bigger, and the lower part is smaller, representing a benched transition. The edge 5 of the mouth necks out so as to form a certain width and thickness, increase strength and also increase the contact area with the groove 4, aiming to achieve better sealing effects. The inner side 10 of the mouth is provided with the convex clamp 11.

As shown in FIG. 3, when the cover 1 covers over the body, the groove 4 will envelop the edge 5 of the mouth, and the lower end face 16 of the cover 1 will be placed at the connecting bench between the mouth 14 and the container 15 so as to prevent the outflow of food liquor from the container 15. The inner wall 6 of the groove 4 and the inner side 10 of the mouth are fastened by using the concave clamp 7 and the convex clamp 11; meanwhile, the convex block 9 on the outer wall of the groove will inwardly press the outer side 12 of the mouth to make the cover contact the body, thus achieving sealing effects. For opening, lift the edge of the cover 1 to open the cover 1.

EXAMPLE 2

As shown in FIG. 4, it is the structure at the joint place between the cover 1 and the body. What is different from Example 1 is that there are additional concave clamps 7 on the inner wall 6 of the groove 4 under the cover 1, and correspondingly the inner side 10 of the mouth is provided an additional convex clamps 11 for the purpose of increasing the firmness of closing.

EXAMPLE 3

As shown in FIG. 5, it is the structure at the joint place between the cover 1 and the body. What is different from example 1 is that the outer wall 8 of the groove under the cover 1 is provided with a clamp block 13, which presses the outer side 12 of the mouth to increase the inward pressure, and also locks the edge of the mouth to further prevent the cover 1 or the body from getting loose under pressure.

As shown in Fig, 6, the upper end face of the cover 1 is made into a concave-convex structure to match the structure of the bottom 2; thus several boxes can be stacked together for the convenience of carrying. Such structure is can be used for the cover 1 of Example 1 , Example 2 and Example 3.

As shown in FIGS. 7 and 8, the sealed food box designed in this invention can be made into a multi-partition one. The inside of the body is divided into several separate partitions with the inner wall 18. On the corresponding positions of the cover 1, the isolation groove 17 is set. The isolation groove 17 envelops the edge of the inner wall 18, and the partition and the cover forms an enclosed space, which can prevent different-taste food from influencing with each other. The multi-partition structure can be the two-partition one as shown in FIG. 7, or the three-partition one as shown in FIG. 8, or others according to the users' needs.

The above sealed food boxes can also be provided with an "Unused" mark as shown in FIG. 9 and 10. The outer side of the edge of the cover 1 is provided with an opening lug 19, and an "Unused" mark 20 is set on the outer side of the lug 19. The lug 19 and the mark 20 are connected through two contacts 21. When opening the cover 1, the contact 21 will break, and the mark 20 will deform or break, thus achieving the purpose of effective identification.

INDUSTRIAL APPLICABILITY

As the cover and the body are firmly fastened together by using the interactions between the inner and outer walls of the grooves on the cover and the inner and outer sides of the body, this product comes with superior compression strength and sealing performances and can effectively prevent the outflow of food liquor.

The invention claimed is:

1. A sealed food box having a cover and an open body made up of a bottom wall and a side wall comprising:
    a lower end face of the cover defining a groove and including an elongated, substantially horizontal inner edge extending between and separating an inner wall and an outer wall of said groove;
    a mouth of the body including an elongated, substantially horizontal outer edge extending between an inner side and an outer side of said mouth, said elongated outer edge of said mouth being in contact with said elongated inner edge of the cover to form a seal between the cover and the body, said groove constructed to envelop said elongated outer edge of said mouth of the body, wherein said inner wall of said groove is firmly placed against an inner side of said mouth through a locking fastener engaging said inner side of said mouth for inhibiting movement of said inner wall of said groove relative to said inner side of said mouth, and a convex block attached to an inner surface of said outer wall of said groove that engages and inwardly presses against a substantial portion of said outer side of said mouth without engaging any portion of a bottom edge of said outer side of said mouth to allow movement of the cover with respect to the body.

2. The sealed food box of claim 1, wherein the body is divided into several partitions and an isolation groove that is set on a corresponding position on the cover, said isolation groove being constructed to envelop an edge of an inner wall of said body, wherein enclosed spaces are formed by said partitions and the cover.

3. The sealed food box of claim 1, wherein the body has a bigger upper part and a smaller lower part representing a benched transition.

4. The sealed food box of claim 1, wherein said locking fastener includes a concave clamp on said inner wall of said groove that forms a releasable, locking connection with a convex clamp on said inner side of said mouth.

5. The sealed food box of claim 4, further including several locking fasteners including both concave and convex clamps.

6. The sealed food box of claim 1, wherein the cover includes an upper end face configured to matingly engage the bottom wall of another container.

7. A sealed food box having a cover and an open body made up of a bottom wall and a side wall comprising:
    a lower end face of the cover defining a groove and including an elongated, substantially horizontal inner edge extending between and separating an inner wall and an outer wall of said groove,
    a mouth of the body including an elongated, substantially horizontal outer edge extending between an inner side of said mouth and an outer side of said mouth, said elongated outer edge of said mouth being in contact with said elongated inner edge of the cover to form a seal between the cover and the body, said groove constructed to envelop said elongated edge of said mouth of the body, wherein an inner wall of said groove is firmly placed against an inner side of said mouth through a locking fastener engaging said inner side of said mouth for inhibiting movement of said inner wall of said groove relative to said inner side of said mouth, and a convex block attached to an inner surface Of an outer wall of said groove that engages and inwardly presses against a substantial portion of an outer side of said mouth without engaging any portion of a bottom edge of said outer side of said mouth; and
    an opening lug on the cover having an "Unused" mark on its outer side, said lug and said mark being connected through an easily-breakable dot-mode contact.

8. The sealed food box of claim 7, wherein the body is divided into several partitions and an isolation groove that is on the corresponding positions on the cover, said isolation groove being constructed to envelop an edge of an inner wall of said body, wherein enclosed spaces are formed by said partitions and the cover.

9. The sealed food box of claim 7, wherein said locking fastener includes a concave clamp on an inner wall of said groove that forms a releasable, locking connection with a convex clamp on an inner side of said mouth.

10. The sealed food box of claim 9, further including several locking fasteners including both concave and convex clamps.

11. The sealed food box of claim 7, wherein the cover includes an upper end face configured to matingly engage the bottom wall of another container.

12. A sealed food box having a cover and an open body made up of a bottom wall and a side wall comprising:
a lower end face of the cover defining a groove, said groove constructed to envelop edges of a mouth of the body, wherein an inner wall of said groove is firmly placed against an inner side of said mouth using a locking fastener engaging said inner said of said mouth for inhibiting movement of said inner wall of said groove relative to said inner side of said mouth, and a convex block attached to an inner surface of the outer wall of said groove that engages and inwardly presses against an entire length of an outer side of said mouth without engaging any portion of a bottom edge of said outer side of said mouth,
said locking fastener including a concave clamp on an inner wall of said groove that forms a releasable, locking connection with a convex clamp on an inner side of said mouth.

* * * * *